United States Patent [19]
Vogeley et al.

[11] Patent Number: 5,227,821
[45] Date of Patent: * Jul. 13, 1993

[54] LIQUID CRYSTAL DISPLAY FOR PROJECTION SYSTEMS

[75] Inventors: James H. Vogeley; Arthur W. Vogeley, both of Yorktown, Va.

[73] Assignee: nView Corporation, Newport News, Va.

[*] Notice: The portion of the term of this patent subsequent to Dec. 11, 2007 has been disclaimed.

[21] Appl. No.: 925,395

[22] Filed: Jul. 22, 1992

Related U.S. Application Data

[60] Continuation of Ser. No. 625,037, Dec. 10, 1990, which is a continuation-in-part of Ser. No. 194,516, May 16, 1988, Pat. No. 4,976,536, which is a division of Ser. No. 44,332, Apr. 30, 1987, Pat. No. 4,763,993.

[51] Int. Cl.[5] .............................................. G03B 21/12
[52] U.S. Cl. ..................................... 353/122; 353/77; 353/74; 353/57; 353/20
[58] Field of Search .................. 353/122, 20, DIG. 5, 353/DIG. 3, 77, 78; 359/37, 63

[56] References Cited

U.S. PATENT DOCUMENTS

| | | | |
|---|---|---|---|
| 1,342,894 | 6/1920 | Bugbee | 353/55 |
| 1,385,162 | 7/1921 | Tillyer . | |
| 1,434,268 | 10/1922 | Tillyer . | |
| 1,462,348 | 7/1923 | Lyons . | |
| 1,518,403 | 12/1924 | Frederick et al. . | |
| 1,592,393 | 7/1926 | Sulzberger . | |
| 1,620,338 | 3/1927 | Frederick . | |
| 1,666,047 | 4/1928 | Jones et al. . | |
| 2,108,054 | 2/1938 | Eitzen . | |
| 2,187,803 | 1/1940 | Griffin . | |
| 2,258,014 | 10/1941 | Kallusch . | |
| 2,283,268 | 5/1942 | Krenin . | |
| 2,395,561 | 2/1946 | Osterberg et al. . | |
| 2,464,887 | 3/1949 | Osterberg et al. . | |
| 2,552,184 | 5/1951 | Koch . | |
| 2,552,185 | 5/1951 | Koch . | |
| 2,569,918 | 10/1951 | Berggren . | |
| 2,660,925 | 12/1953 | Turner . | |
| 2,668,478 | 2/1954 | Schroder . | |
| 2,688,271 | 9/1954 | Gretener . | |
| 2,700,323 | 1/1955 | Schroder . | |

(List continued on next page.)

FOREIGN PATENT DOCUMENTS 0127701 12/1984 European Pat. Off. .

(List continued on next page.)

OTHER PUBLICATIONS

"The Journal of the Institute of Television Engineers of Japan" 1984, vol. 38.

(List continued on next page.)

*Primary Examiner*—William A. Cuchlinski, Jr.
*Assistant Examiner*—William C. Dowling
*Attorney, Agent, or Firm*—Nixon & Vanderhye

[57] ABSTRACT

Disclosed is a liquid crystal display unit comprising liquid twisted nematic liquid crystal material sandwiched between two polarizers. Transparent electrodes are provided on each side of the layer of liquid crystal for locally energizing liquid crystal material in the vicinity of two energized transparent electrodes. Polarized light passing through one polarizer is twisted or not twisted depending upon the energization state of the liquid crystal material and depending upon the second polarizer orientation does or does not pass therethrough. Accordingly, depending upon energization locations, images are formed which can be projected upon a screen. In preferred embodiments the liquid crystal display unit is used in conjunction with a cabinet to provide a low stress work station. A further embodiment includes a folded optical path in combination with the liquid crystal display so as to provide a compact projector. When operating in conjunction with an overhead projector, a preferred embodiment of the present invention is powered by light energy from the overhead projector and in a further preferred embodiment is controlled through the use of infrared or other non-visible electromagnetic communication.

41 Claims, 5 Drawing Sheets

U.S. PATENT DOCUMENTS

| | | |
|---|---|---|
| 2,742,819 | 4/1956 | Koch et al. . |
| 2,813,802 | 11/1957 | Ingle et al. . |
| 2,852,980 | 9/1958 | Schroder . |
| 2,883,291 | 4/1959 | Fraser ................................ 359/350 |
| 3,113,033 | 12/1963 | Hoxie et al. ........................ 359/350 |
| 3,174,067 | 3/1965 | Bahrs ................................... 313/114 |
| 3,217,596 | 11/1965 | Murray et al. . |
| 3,250,175 | 5/1966 | Braun . |
| 3,253,504 | 5/1966 | Vollmer . |
| 3,255,342 | 6/1966 | Seitz et al. . |
| 3,293,982 | 12/1966 | Appeldorn . |
| 3,325,666 | 6/1967 | Bird et al. ........................... 313/113 |
| 3,482,911 | 12/1969 | Noble .................................. 353/98 |
| 3,499,112 | 3/1970 | Heilmeier et al. ................... 178/7.7 |
| 3,499,702 | 3/1970 | Goldmacher et al. . |
| 3,514,198 | 5/1970 | Schacht et al. ...................... 353/21 |
| 3,536,391 | 10/1970 | Anderson et al. .................... 353/98 |
| 3,574,444 | 4/1971 | Hipp, Jr. . |
| 3,575,452 | 4/1971 | Blomgren . |
| 3,575,499 | 4/1971 | Mahoney, Jr. ........................ 353/21 |
| 3,586,851 | 6/1971 | Rudolph ............................... 240/47 |
| 3,761,172 | 9/1973 | Letzer .................................. 355/3 |
| 3,807,850 | 4/1974 | Ozeki ................................... 353/23 |
| 3,824,003 | 7/1974 | Koda et al. ........................... 350/160 |
| 3,836,243 | 9/1974 | Melchior ............................. 353/122 |
| 3,844,650 | 10/1974 | Nicholson et al. ................... 353/122 |
| 3,862,360 | 1/1975 | Dill et al. . |
| 3,895,866 | 7/1975 | Quervain et al. .................... 353/30 |
| 3,944,320 | 3/1976 | McLintie . |
| 3,979,160 | 9/1976 | Anderson et al. .................... 353/63 |
| 3,980,403 | 9/1976 | Pollack ................................ 353/121 |
| 4,060,316 | 11/1977 | Pollack et al. ....................... 353/38 |
| 4,080,052 | 3/1978 | Levin et al. .......................... 353/38 |
| 4,088,400 | 5/1978 | Asouline et al. ..................... 353/20 |
| 4,095,881 | 6/1978 | Maddox ............................... 355/30 |
| 4,154,007 | 5/1979 | Judd . |
| 4,165,160 | 8/1979 | Persha et al. ........................ 353/55 |
| 4,171,874 | 10/1979 | Bigelow et al. . |
| 4,185,895 | 1/1980 | Stephens et al. . |
| 4,194,833 | 3/1980 | Lester et al. ......................... 355/14 |
| 4,195,915 | 4/1980 | Lichty et al. . |
| 4,222,641 | 9/1980 | Stolov ................................. 353/84 |
| 4,239,349 | 12/1980 | Scheffer . |
| 4,275,395 | 6/1981 | Dewey et al. ........................ 340/706 |
| 4,294,524 | 10/1981 | Stolov ................................. 353/20 |
| 4,315,258 | 2/1982 | McKnight et al. ................... 340/784 |
| 4,338,006 | 7/1982 | Ozeki .................................. 353/85 |
| 4,349,817 | 9/1982 | Hoffman et al. ..................... 340/784 |
| 4,365,869 | 12/1982 | Hareng et al. . |

(List continued on next page.)

FOREIGN PATENT DOCUMENTS

| | | |
|---|---|---|
| 0197265 | 10/1986 | European Pat. Off. . |
| 483742 | 9/1929 | Fed. Rep. of Germany . |
| 916358 | 7/1955 | Fed. Rep. of Germany . |
| 1132744 | 7/1962 | Fed. Rep. of Germany . |
| 2339079 | 2/1975 | Fed. Rep. of Germany . |
| 2519616 | 11/1976 | Fed. Rep. of Germany . |
| 3413995A1 | 10/1985 | Fed. Rep. of Germany . |
| 3506968A1 | 10/1985 | Fed. Rep. of Germany . |
| 610040 | 8/1926 | France . |
| 2559923 | 8/1985 | France . |
| 2596880 | 10/1986 | France . |
| 47-18333 | 9/1972 | Japan . |
| 50-68526 | 2/1975 | Japan . |
| 50-68739 | 6/1975 | Japan . |
| 52-119321 | 10/1977 | Japan . |
| 5532859 | 3/1978 | Japan . |
| 54-130432 | 9/1979 | Japan . |
| 57-136142 | 8/1982 | Japan . |
| 58-35526 | 6/1983 | Japan . |
| 59-19924 | 2/1984 | Japan . |
| 59-90987 | 6/1984 | Japan . |
| 60-13225 | 1/1985 | Japan . |
| 60-213935 | 10/1985 | Japan . |
| 61-20902 | 1/1986 | Japan . |
| 61-140345 | 8/1986 | Japan . |
| 61-203412 | 9/1986 | Japan . |
| 61-246731 | 11/1986 | Japan . |
| 62-34878 | 2/1987 | Japan . |
| 281066 | 6/1927 | United Kingdom . |

OTHER PUBLICATIONS

SPIE vol. 250, 1980, "Liquid Crystal Light Projector, etc." R. S. Gold, pp. 59–68, Optomechanical Systems Design (1980).

IEEE Trans on Elec. Devices, vol. ED-17, No. 5, May 1970, Design of an Electrooptic Light Valve Projection Display, T. H. Moore.

Apparatus for Teaching Physics, W. C. Connolly, Depart. of Physics, Appalachian State University, Boone, N.C., Sep. 1985, pp. 382–383.

Article in *PC Week*, Feb. 11, 1986, VIP Device alleged to have been shown in Mar. 1986 & alleged to have been offered for sale before Apr. 1986 and alleged to have been used in public on Apr. 1986.

VIP Device photographs alleged to have been made by Chisholm, 910 Campise Way, Suite 2C, Campbell, Calif.

(List continued on next page.)

U.S. PATENT DOCUMENTS

| | | | |
|---|---|---|---|
| 4,368,963 | 1/1983 | Stolov | 353/31 |
| 4,372,639 | 2/1983 | Johnson . | |
| 4,386,826 | 6/1983 | Stolov . | |
| 4,386,836 | 6/1983 | Aoki et al. | 355/3 R |
| 4,403,216 | 9/1983 | Yokoi | 340/705 |
| 4,409,583 | 10/1983 | Dahan et al. | 340/22 |
| 4,420,234 | 12/1983 | Dolejsi et al. | 353/122 |
| 4,423,927 | 1/1984 | Bly . | |
| 4,453,810 | 6/1984 | Curiel | 353/55 |
| 4,507,547 | 3/1985 | Taga et al. | 219/543 |
| 4,514,042 | 4/1985 | Nukii et al. . | |
| 4,526,441 | 7/1985 | Dowden et al. . | |
| 4,536,014 | 8/1985 | Boutaleb et al. | 283/83 |
| 4,564,276 | 1/1986 | Hofmann et al. | 353/55 |
| 4,577,959 | 3/1986 | Yazaki | 355/67 |
| 4,613,207 | 9/1986 | Fergason . | |
| 4,652,101 | 3/1987 | Grunwald | 353/122 |
| 4,660,936 | 4/1987 | Nosker . | |
| 4,664,482 | 5/1987 | Kando et al. . | |
| 4,671,634 | 6/1987 | Kizaki et al. | 353/122 |
| 4,687,301 | 8/1987 | Ledebuhr . | |
| 4,704,004 | 11/1987 | Noske . | |
| 4,722,593 | 2/1988 | Shimazaki . | |
| 4,726,662 | 2/1988 | Cromack . | |
| 4,756,604 | 7/1988 | Nakatsuka et al. . | |
| 4,763,993 | 8/1988 | Vogeley et al. | 333/70 |
| 4,765,718 | 8/1988 | Henkes . | |
| 4,765,734 | 8/1988 | Trac et al. | 353/121 |
| 4,770,525 | 9/1988 | Umeda et al. | 353/122 |
| 4,779,510 | 10/1988 | Van den Abbeel | 84/464 |
| 4,787,737 | 11/1988 | Ogawa et al. | 353/60 |
| 4,812,034 | 3/1989 | Mochizuki et al. | 353/122 |
| 4,824,210 | 4/1989 | Shimazaki . | |
| 4,846,694 | 7/1989 | Erhardt | 434/365 |
| 4,864,390 | 9/1989 | McKechnie et al. | 358/60 |
| 4,880,303 | 11/1989 | Grunwald | 353/122 |
| 4,881,110 | 11/1989 | Braatz et al. | 357/30 |
| 4,882,599 | 11/1989 | Grunwald | 353/60 |
| 4,941,732 | 7/1990 | Umeda et al. | 353/78 |
| 4,944,578 | 7/1990 | Denison . | |
| 4,953,971 | 9/1990 | Highfill | 353/122 |
| 4,976,536 | 12/1990 | Vogeley et al. | 353/122 |
| 5,048,949 | 9/1991 | Sato et al. | 353/77 |

OTHER PUBLICATIONS

95008.
PC Presenter Series, "Built-In and Add-On LCD's for Creating Large Screen Graphic Presentations with your Personal Computer", Apollo Disclosure.

Sayett Discovery Documents T035010, T030189, T025064–T025066, T030156, T025047–T025048, T025058–T025059.

LIQUID CRYSTAL DISPLAY FOR PROJECTION SYSTEMS

RELATED APPLICATIONS

This application is a continuation of U.S application Ser. No. 07/625,037 filed Dec. 10, 1990 which is a continuation-in-part of U.S. Ser. No. 07/194,516 filed May 16, 1988 which issued as U.S. Pat. No. 4,976,536 on Dec. 11, 1990, which in turn is a divisional of U.S. Ser. No. 07/044,332 filed Apr. 30, 1987 now U.S. Pat. No. 4,763,993 issued Aug. 16, 1988.

BACKGROUND AND SUMMARY OF THE INVENTION

1. Field of the Invention

The present invention relates to projection systems in general, and specifically to a liquid crystal display system for use in conjunction with an overhead projector for displaying computer generated images.

2. Discussion of the Prior Art

The use of a liquid crystal display (LCD) in conjunction with a conventional overhead projector is disclosed in U.S. Pat. No. 4,154,007 issued to Wallace P. Judd. The Judd patent describes an electronic calculator modified so as to permit light to pass through the top and bottom plates of an LCD. This allows the calculator to be placed onto a conventional overhead projector thereby projecting an enlarged image of the calculator LCD on the projection surface. The LCD in Judd appears to be comprised of smectic crystals which, when not energized by an electric field, are transparent to light passing therethrough but become opaque to this light when energized. The opacity is due to the fact that energizing of the crystals places them in a disorganized state which causes light to be scattered in all directions. Because the smectic crystals only change the character of light passing through (from unscattered to scattered) much of the light and heat energy passes through the crystals. Unfortunately because the light is only altered slightly smectic displays tend to have a relatively low contrast.

Additionally to avoid excess drive circuitry and electrical interconnections, most LCD displays are multiplexed which means that each portion of the display is addressed (or energized) for only a fraction of the time. In a twelve digit calculator display, each digit would be addressed only one-twelfth of the time or it can be said that the display has a 1/12 duty cycle.

In order to improve contrast, modern calculators have changed to twisted nematic crystal displays which, if multiplexed at relatively high duty cycles, such as those associated with simple calculators, can produce high contrast readability. Such displays require the use of polarizers. Although polarizers tend to cause the display to absorb more heat and thus reduce the contrast, the high initial contrast obtainable with the high duty cycle calculator display could tolerate the heat without contrast being objectionably reduced. If the Judd-type patent were modified to utilize such a twisted nematic crystal display, the heat associated with an overhead projector would probably not cause any serious difficulty in its operation because of the high duty cycle.

However, where a higher resolution display is desired, for example a 25 line by 80 column and/or graphic display, a much lower duty cycle is available with respect to energization of each element, i.e., on the order of 1/100. Smectic crystals are unworkable because of their inherent low contrast. The very low duty cycle also makes the contrast available from twisted nematic crystal displays marginal and, when combined with the contrast reduction caused by polarizer heating, such displays are impractical.

A typical projector has a high power incandescent or halogen lamp utilizing 250 to 500 watts or more during operation. In many instances 90% of the radiation generated by the lamp is in the infrared or heat producing frequency range. Excess temperatures can be harmful to liquid crystal displays causing their destruction if high enough. However, even below the destructive temperature level, the effect of high temperatures is to decrease LCD contrast.

The optics of most conventional projectors also tends to exacerbate the heat problem. The projectors in general focus the light beam so that it impinges upon a lens (generally of the Fresnel type) upon which the projected material (in this case the LCD) is placed. The function of this lens is to direct the light so that it passes through the projection optics thus achieving the brightest possible projected image. While the attempt is made to focus light on the lens as uniformly as possible, the light energy may vary by as much as 50% or more from a "hot spot" in the center of the lens to the edges. Because it is necessary to have enough light so that the edges of the display are readily visible, this means that the temperature effects due to the hot spot in the center are even greater than elsewhere on the display.

Although some rather expensive overhead projectors tend to reduce the heat problem by arrangements of heat-absorbing and/or heat-reflecting glass or filters, the lower cost projectors make little attempt to reduce heat at the display surface. It is desirable that any LCD projection system be able to utilize any projecting apparatus.

A further problem in the use of LCD systems with overhead projectors is the requirement for an external power supply and a data input cord rendering such systems cumbersome to use.

SUMMARY OF THE INVENTION

It is, therefore, an object of the present invention to provide a liquid crystal display apparatus compatible for use with all overhead projectors providing high contrast readability.

It is a further object of the present invention to provide an LCD display for use with an overhead projector which has no external power cord connection.

It is a further object of the present invention to provide an LCD display for use with an overhead projector where the display requires no external power or data input connecting cord.

It is a still further object of the present invention to provide an integrated projection system for projecting computer or graphic display information.

It is an additional object of the present invention to provide an integrated low visual stress work station for displaying high resolution information.

It is a still further object of the present invention to provide a desktop projector of high resolution information where the projector is extremely compact and portable.

The above and other objects are achieved in accordance with the present invention by utilizing a light transparent insulation means and a polarizer or back polarizing filter between the light source and the twisted nematic crystal display. The analyzer or front polarizing filter is located between the twisted nematic crystal display and the projection screen. The use of transparent conductors on the LCD facilitates localized energization of the twisted nematic crystal where it is desirable to produce a change in opacity of the display.

In one embodiment, a heat reflective film is the light transparent insulation means and is utilized to further reduce the heat input to the twisted nematic crystal. In a further embodiment, the liquid crystal display is powered by solar cells located on the display for converting a portion of the overhead projector light energy to electrical energy for use in the display eliminating the need for a separate power cable. In a still further preferred embodiment, the computer or other control means communicates with the display through a wireless communication system eliminating the need for any external cables connected to the display. In a further embodiment, the display is combined with a projector resulting in a compact low cost projection system. In a further preferred embodiment the display is utilized in conjunction with a lower power projector in a computer or word processing work station to provide a low visual stress display system. In an additional embodiment, the combination of folded optics, a "cold mirror" and the LCD provide a compact and portable desktop electronic information projector.

BRIEF DESCRIPTION OF THE DRAWINGS

A more complete appreciation of the invention, and many of the attendant advantages thereof will be readily apparent by reference to the accompanying drawings, wherein.

DETAILED DESCRIPTION OF THE PREFERRED EMBODIMENT

Figure 1:
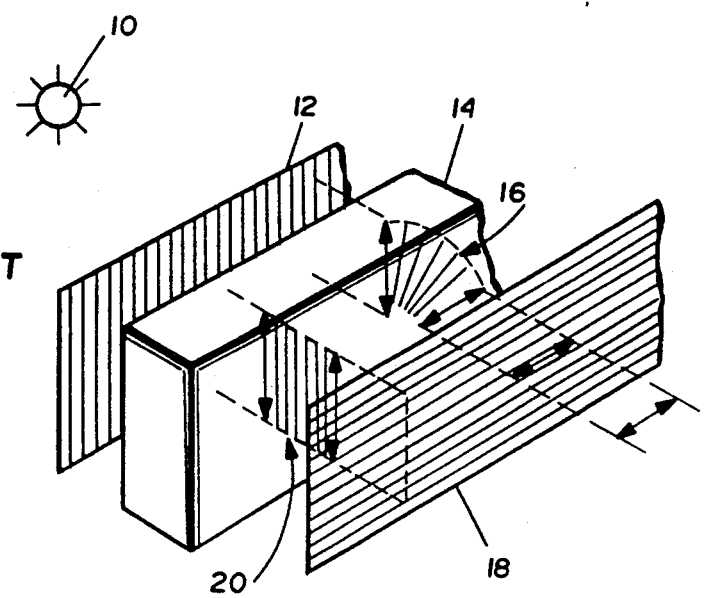
FIG. 1 is a schematic representation of the effect of a twisted nematic crystal display.

FIG. 1 illustrates the operation of a liquid crystal material situated between two polarizers. A light source 10 will emit light having no specific polarization. However, light passing through polarizer or back polarizing filter 12 will have only a vertical orientation as it enters twisted nematic liquid crystal material 14. In the illustrated embodiment, in unenergized area 16, the local region where the liquid crystal is unenergized, the light polarization is rotated a specific angle (such as the 90° shown) which changes it to a horizontal polarization which passes through analyzer or front polarizing filter 18. However the energized area 20 of the liquid crystal display allows light to pass through without its polarity being twisted and the vertically polarized light would be blocked by the horizontally polarized analyzing filter 18. Thus in FIG. 1 as shown energized areas of the liquid crystal would be dark and unenergized areas would be light. Thus one would have dark graphics on a light background. If either polarizers were rotated approximately 90° the effect would be reversed, allowing light to be transmitted where the liquid crystal is energized and for light to be blocked where the liquid crystal is not energized, providing a light graphics on a dark background.

Figure 2:
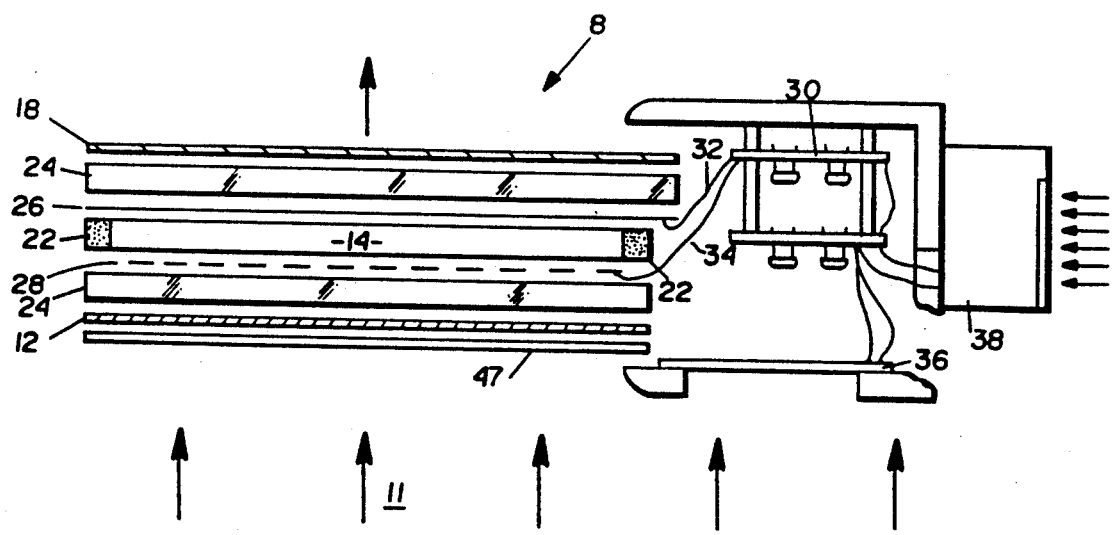
FIG. 2 is a side exploded view of a twisted nematic crystal display in accordance with the present invention.

FIG. 2 illustrates the basic embodiment of applicant's invention. The twisted nematic liquid crystal material 14 is bounded by sealing material 22 and contained between two transparent plates 24. A multiplicity of transparent electrodes 26 extending across the figure are orthogonal to a multiplicity of transparent electrodes 28 which extend generally in a direction perpendicular to the plane of the drawing. When pairs of these electrodes are simultaneously addressed, they serve to energize the twisted nematic liquid crystal material 14 in the immediate vicinity of the junction of the energized electrodes. The criss-crossing multiplicity of electrodes comprises a means for locally energizing the crystal material in response to the control unit 30 through a multiplicity of control wires 32 and 34. Power to operate control unit 30 can be supplied externally or, in an embodiment shown in FIG. 2, through solar cell 36 which converts a portion of the illumination from the projector itself into electricity.

Information to the control unit 30 on which electrodes are to be energized or de-energized can be provided through an external connecting cable to the computer providing image information or in the preferred embodiment shown in FIG. 2 through an infrared control receiver 38 which is responsive to infrared transmissions from a transmitting device similar to infrared television and video cassette recorder transmitters. In the preferred embodiment shown in FIG. 2 no external connections at all will be necessary to power or control the device rendering it extremely easy to use. In FIG. 2 polarizer 12 could include an infrared mirror which allows visual light to pass but serves to reflect the infrared (heat-producing) portion of the light 11 from the light source.

In a preferred embodiment, the liquid crystal display panel in FIG. 2 would utilize a heat reflecting film 47 adjacent or separated from polarizer 12 to reduce the amount of heat passing through the liquid crystal material 14. A preferred embodiment utilizes a heat reflecting film 47 marketed under the trademark Altair-M by Southwall Technologies in Palo Alto, Calif. The Altair-M coating is sputter-deposited and results in a film that has visible light transmissivity and also electrical conductivity. Electrical conductivity is advantageous in that it helps prevent broadcast of electromagnetic interference beyond the confines of the display device. The film additionally has superior environmental stability over many other coating processes although additional sheets of glass can be used to protect the film and/or polarizer from scratching.

Figure 3A:
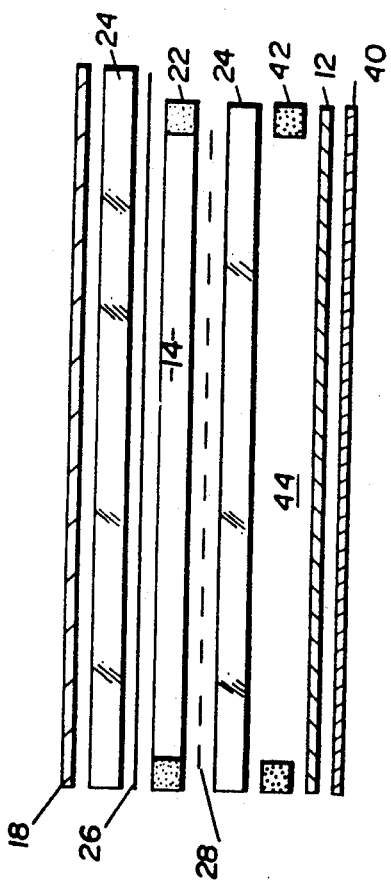
FIGS. 3a and 3b are side exploded views of twisted nematic crystal displays in accordance with a further embodiment of the present invention.
Figure 3B:
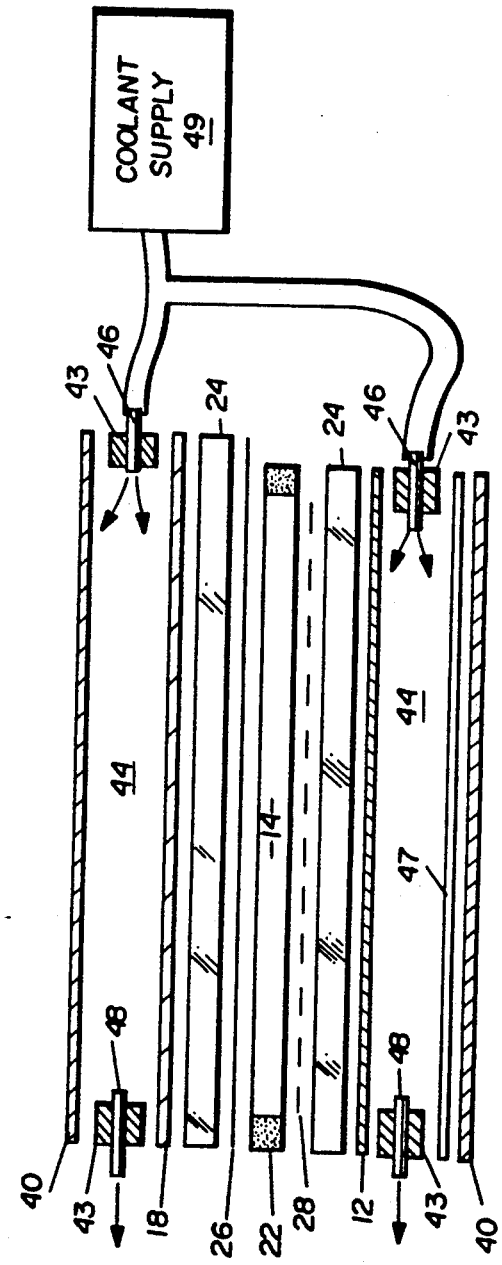

Alternate embodiments of the transparent portion of the display unit are shown in exploded views of FIGS. 3a and 3b. In addition to the other previously discussed components, FIG. 3a illustrates a further plate 40 which, with polarizer 12, is separated from transparent plate 24 by spacing material 42. In a preferred embodiment, the spacing material could be permeable to air and water vapor but impermeable to contaminants such as dust, thereby reducing any degradation over a time. In the FIG. 3a embodiment a single insulating or air space 44 serves to further insulate the temperature sensitive twisted nematic liquid crystal material 14 from heat transmitted from the light source 10.

In extreme temperature and humidity environments, it may be desirable to utilize the variation shown in FIG. 3b which includes two plates 40 and two sets of impermeable spacers 43 forming two air spaces 44 for providing greater insulation. The spacers 43 are shown with inlets 46 and outlets 48. The inlets 46 are connected to a coolant supply 49 which may be any transparent fluid. The fluid, in a preferred embodiment air, flows through the spaces on one or both sides of the liquid crystal material 14 cooling it during operation. The before mentioned heat reflecting film 47 is also illustrated. Of course the embodiments of FIG. 3a and 3b could also utilize the previously discussed infrared mirrors as back plates 40 in order to reflect any infrared light away from the liquid crystal material 14.

Figure 4A:
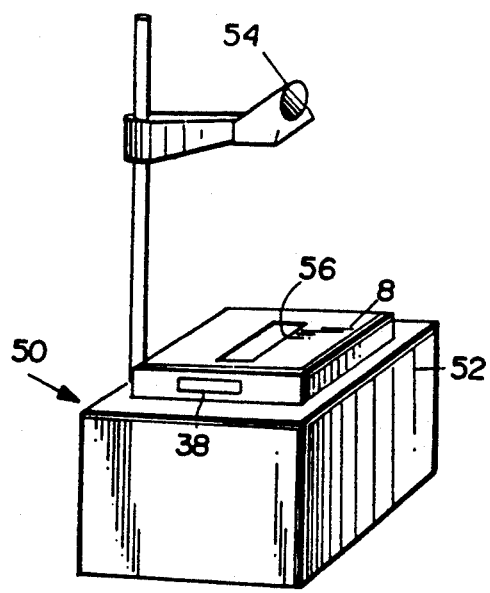
FIG. 4a shows the present invention being utilized with a conventional overhead projector.

FIG. 4a illustrates the use of the display unit 8 in combination with a conventional overhead projector 50. Projector 50 includes a lower portion 52 housing the light source and initial reflecting and focusing mirrors and lenses, and an upper mirror/lens assembly 54. Display unit 8 is placed over the normal projection surface and includes an aperture 56 which corresponds to the visible light transparent portion of the display unit. Solar cells 36, not shown because they are on the lower portion of the display unit 8, could provide sufficient electrical power to run the control unit and the energization and de-energization of the various transparent electrodes in the unit. Information concerning which electrodes are to be energized and de-energized can be supplied by means of infrared receiver 38. Thus it can be seen that display unit 8 is quite portable and can be used with any existing overhead projector system and the use of the solar cell and infrared data link eliminate any problem with cords.

Figure 4B:
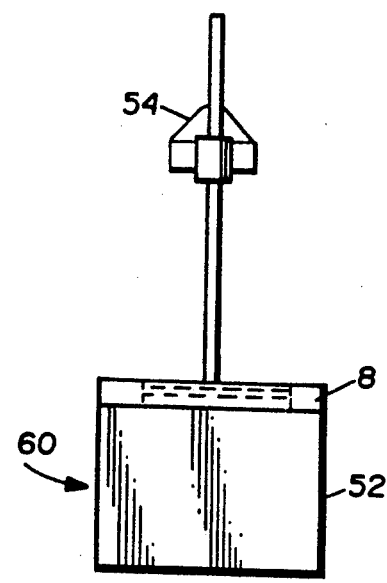
FIG. 4b illustrates an integrated overhead projector combined with an LCD display in accordance with the present invention.

In FIG. 4b a further preferred embodiment is illustrated in which the display unit portion 8 is built in to the overhead projector 60. Because this unit is not as portable it may not be quite as convenient although the fact that the display unit is part of the lower portion 52 eliminates the need for solar cell installation on the unit in order to power the control unit and a simple internal conductor connection will suffice. Similarly, there is no need to utilize infrared receiver 38 as a direct computer connection to the display unit 8 through lower portion 52 can easily be accomplished. However, it may be desirable to retain the infrared receiver 38 so that the projected image can be ultimately controlled from a remote location.

The present invention can also be utilized in conjunction with or built into a low stress work station for computer/word processing operators or any other individuals who would normally work in front of a monitor or a cathode ray tube (CRT) screen. Normal viewing distances from an operator to a keyboard is about 24 inches and from the operator to the CRT is about 28 to 30 inches. It has been found that if a display can be provided at a further distance from the operator but with larger characters (so that the viewing angle subtended by the character is equal to or greater than that of the CRT) much less visual stress is created.

Contrast ratio is concerned with differences in the brightness between the viewed information and the immediate background and between the immediate background and the larger surround. A difference between light information on a dark CRT display and black information on a white printed page is that the informational elements in the display are luminous and are seen by direct rather than reflected light. Contrast ratios for the CRT display for comfortable viewing can be rather low with values of 2 or even less. Because the informational content of a typical CRT display is less than about 5% of the display area, the sparseness of luminosity causes the eye to adapt to the generally dark background. However, many times the luminance of the presented information is increased in an attempt to overcome the effects of reflections, glare, etc. and it is this increased luminosity which leads to increased viewing stress. An operator at a display seldom spends more than 25% of their time viewing the display and the remainder of their time is spent looking around at the keyboard, reference materials, at distractions or simply for a rest. Because all of these areas differ in luminance, the eye must continually change aperture to adapt to the differences in luminance. Stress because of this continuous adaptation can be minimized if the contrast ratios between these various areas are all kept to relatively low values. CRT displays are generally relatively small and thus occupy only a small portion of the visual field. A larger display occupying a greater portion of the visual field together with proper lighting control in the surrounding areas leads to lowered stress levels.

Reflection and glare are also problems, are important sources of stress and in many instances are outside of the control of the operator. Because a conventional CRT display has a convex surface, it provides reflections over a wide field of view. The inability to reposition a CRT display so as to eliminate all substantial reflections can cause additional visual stress. Focus and flicker are additional problems causing visual stress. A cathode ray tube display is electronically focused and over a period of time the focus may drift causing the display to go slightly out of focus. Additionally because of the CRT line scan, frame rates on the order of 50 to 60 Hertz are generated. Some flicker perception is obtained even at these high frame rates leading to additional visual stress.

Figure 5A:
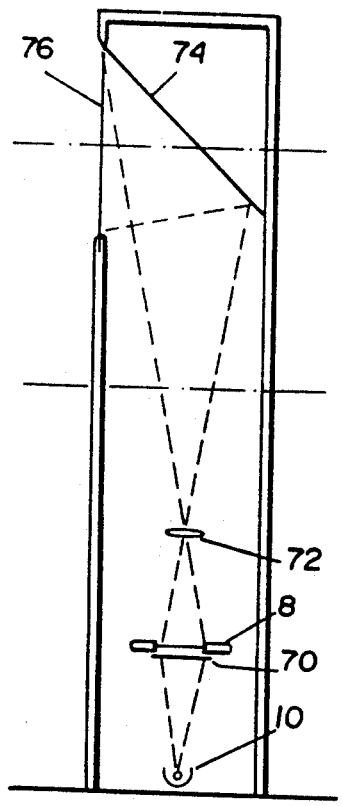
FIGS. 5a and 5b illustrate low stress work stations in accordance with the present invention with conventional light source and a point light source, respectively.
Figure 5B:
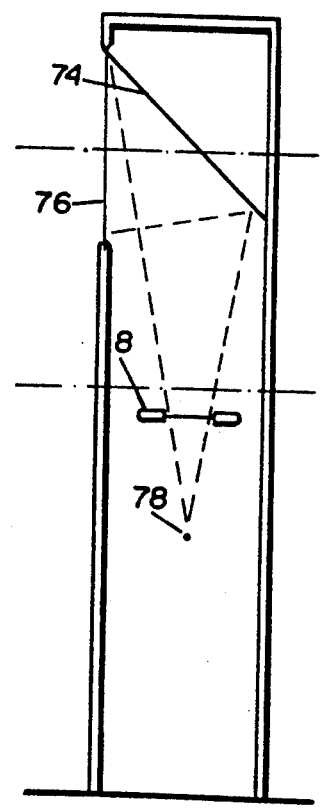

In order to overcome a number of problems relating to visual stress in the workplace, applicant's invention can be utilized in conjunction with or incorporated into a low stress work station, examples of which are shown in FIGS. 5a and 5b. Both arrangements in FIGS. 5a and 5b would provide for an image width of around 36 inches allowing for viewing at a distance of at least 36 inches. FIG. 5a utilizes an enclosure with the conventional light source 10 providing illumination through a Fresnel lens 70 to the display unit 8 whereupon the light passes through projection lens 72, is reflected by front surface mirror 74 onto rear projection screen 76.

The embodiment in FIG. 5b does not require any refractive optical elements such as Fresnel lens 70 or projection lens 72 and instead utilizes an extremely small point light source 78 and the direct transmission of the light through display unit 8 reflecting off of front surface mirror 74 onto the rear projection screen 76.

This embodiment has a significantly shorter optical path than that of FIG. 5a and operates similarly to the well known shadowgraph technique. Obviously because of their different locations in the view screens, the display unit in FIG. 5a would provide the reverse image on the rear projection screen 76 as opposed to the image provided by the display unit in FIG. 5b. This reversal as between the two different work stations can be accommodated mechanically by turning over the display unit 8 (assuming that the temperature and insulating qualities and components of the display unit are not critical to its operation or that it has the same insulating capabilities on both sides of the liquid crystal display) or by merely correcting for this in the electronic control unit or the operating software.

The advantages of the low stress work station displays are that the higher brightness level of the display background (much closer to the normal surround luminosity) and the lower contrast ratio between the image and the display background tends to reduce the stress due to screen and image brightness. The greater viewing distance especially at a distance where the eye tends to operate with a greater depth of focus tends to reduce stress due to changes in focus required with head movement. Larger image sizes and the larger visual angle subtended tends to improve readability and allow for a less precise focus. Also, with a keyboard and a normal CRT they are roughly the same distance from the eye, causing the eye to maintain the same focus all the time. Because the work station display is substantially farther from the eye than the keyboard, the eyes focus must change in shifting back and forth, thus providing a "restful exercise." The large screen size relative to the field of view tends to reduce stress due to differences in brightness between the display screen and the visual surround. The liquid crystal display unit being digital in nature (energized area or pixel only at cross points between transparent conductors) tends to reduce stress due to display focus or lack thereof. Low contrast ratio of the display unit tends to reduce stress due to flicker. The flat rear projection screen 76 tends to reduce stress from reflections and reduce reflected glare. Often times the flat screen can be repositioned to avoid undesirable reflections altogether.

Figure 6A:
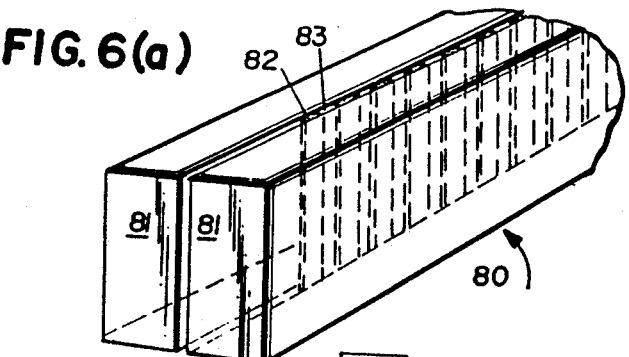
FIGS. 6a and 6b illustrate an elastomeric connector and its use in assembly of one embodiment of the present invention, respectively.

Various preferred embodiments for packaging a display unit 8 have been examined and found suitable. Although FIG. 2 illustrates an exploded view of the device with only one edge housing the control unit being shown, in practice each unit would have an inner transparent image generating area surrounded by an outer frame or other structure. FIG. 2 illustrates the use of control wires 32 and 34 to connect the energizing electrodes 26 and 28 to the control unit 30, but one preferred embodiment applicant's invention utilizes an elastomeric connector 80 and a portion of such a connector is shown in FIG. 6a.

Figure 6B:
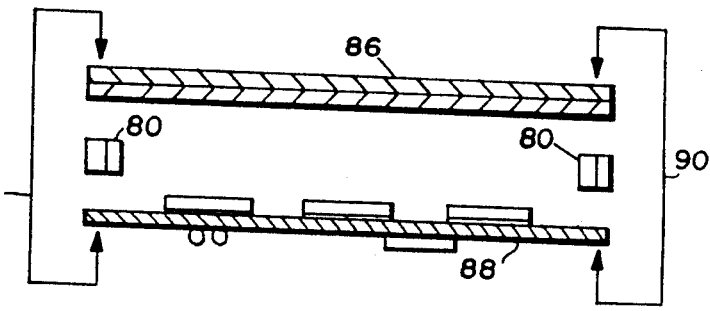

The elastomeric connector 80 includes a pair of insulating strips 81 sandwiching conductive elements 82 and non-conductive elements 83 in an alternating fashion. The application of such an elastomeric connector is illustrated in FIG. 6b which includes an LCD panel 86 which is the transparent portion of the display unit shown in FIG. 2 or the units shown in FIGS. 3a and 3b. A display driver board 88 is comprised of printed circuit boards and/or elements making up the electronic control unit 30, solar cell 36 and/or infrared receiver 38. The elastomeric connectors serve to provide conduction paths between the driver board and the transparent electrodes located in the LCD panel. Appropriate connector pads would be located on the LCD panel and similar pads would be provided on the driver board 88. Edge clamps 90 (represented by arrows in FIG. 6b) would serve to firmly compress the elastomeric connector between the pads on the LCD panel 86 and on the driver board 88. Although it cannot be seen in this view, the driver board 88 would obviously have a substantial aperture in the board so that light could pass therethrough and consequently through the LCD panel for image display purposes.

Figure 7A:
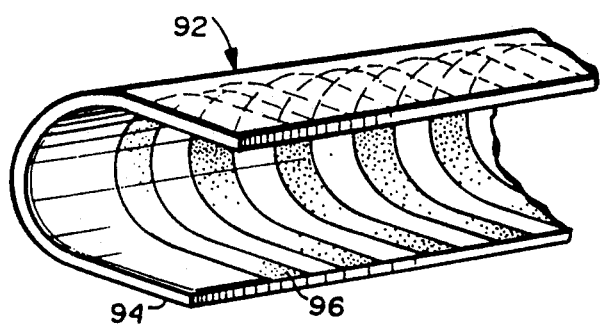
FIGS. 7a and 7b show a flex circuit connector and its use in the assembly of one embodiment of the present invention, respectively.
Figure 7B:
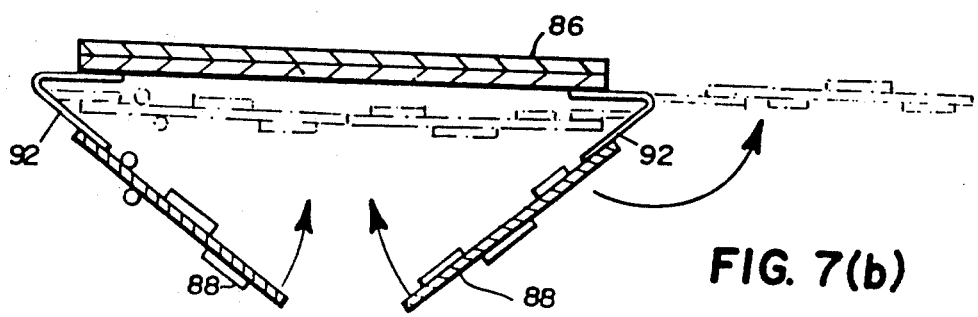

A further alternative connection method is that of flex circuit 92 shown in FIG. 7a. The flex circuit utilizes a flexible insulative substrate 94 upon which electrical conductors 96 have been painted or otherwise deposited. The use of such a flex circuit is shown in FIG. 7b in which the conductive portions of the flex circuit are connected to the appropriate portions of driver board 88 on the one hand and the appropriate transparent electrodes in the LCD panel on the other hand. In this manner the display unit can be folded easily and inexpensively during manufacture. The final position of both driver boards is shown in phantom lines in FIG. 7b and the initial manufacturing position of the righthand driver board is also shown in phantom lines.

Figure 8:
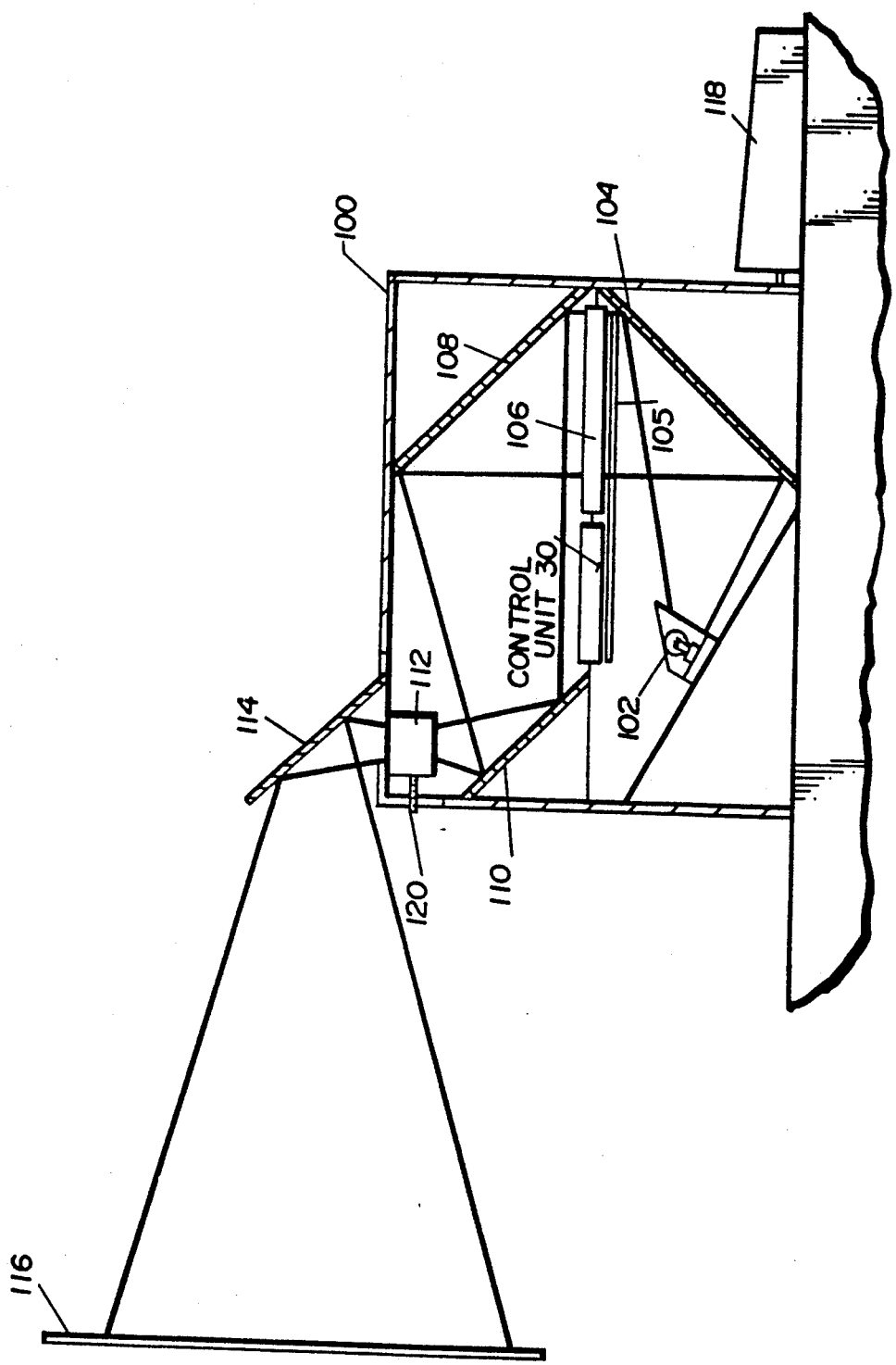
FIG. 8 is a side view partially in section of a further embodiment of the present invention.

A further embodiment of the present invention is a portable and compact desktop information projector 100 shown in FIG. 8. Instead of supplying information to essentially one operator as in the low stress work station, it is envisioned that there is a need for a projection system capable of being viewed by 3 to 5 people simultaneously for the projection of electronic data information. It is desirable that such a system be completely self-contained although it is envisioned that substantially lower projection lamp intensities will be required due to the much smaller projection area as compared to that of the conventional overhead projector.

In FIG. 8, the low power light source 102 provides an initial beam of light toward first mirror 104 which may advantageously be a "cold mirror", i.e., one which reflects visible light but passes infrared light. If mirror 104 is a "cold mirror" much of the heat from light source 102 would be passed to the righthand portion of the enclosure and could then be radiated to the room. The beam of light reflected by mirror 104 passes through Fresnel lens 105 and the LCD display 106 which may be similar to those described with reference to FIGS. 2, 3a or 3b. Light is then reflected from second mirror 108 and third mirror 110 through lens system 112 to a fourth mirror 114 and from there onto the projection surface 116. Electronic data information may be entered into the projector by means of a computer and/or keyboard 118 which is connected (not shown) to control unit 30 which is also connected (not shown) to the LCD display 106. The focus of lens system 112 can be controlled by adjuster 120.

In order to obtain suitable image clarity at the projection surface 116 it is desirable to have the largest LCD display 106 available. However, in order to avoid the necessity for extremely complex, and thus expensive, lens systems, it is necessary to have the longest optical path possible. In FIG. 8 the optical path is folded four times allowing for the components to be arranged in a relatively compact fashion and still provide a high resolution projection with a relatively inexpensive lens system. If a "cold mirror" is used for the first mirror 104 it may be unnecessary to provide any further heat insulation or temperature protection for the LCD display 106 in view of the relatively low power light source 102.

The desktop information projector 100 is quite portable and yet will provide a high contrast image suitable for viewing by a plurality of operators and may be extremely useful for teaching and demonstrating computers, computer-generated graphic systems, etc. mirror" which passes infrared but reflects visible light.

In accordance with the above, it will be seen that applicant's liquid crystal display unit can be utilized with any conventional overhead projector to provide computer generated images in a projection format. It will be seen that the basic display unit will have a relatively low cost and due to solid state technology will be extremely reliable. The device is capable of providing image animation and the image content is alterable in real time by means of the computer control connection. The device is also extremely portable and is compatible with all overhead projection systems. In combination with an appropriate work station housing the display unit can provide an extremely low stress work place when replacing the more conventional CRT.

The desktop information projector and the low stress work station can also be used in many situations in which the presence of a rear or front projector, respectively, would be undesirable. Examples would be point of sale or store window displays, restaurant and cafeteria displays, transportation terminal displays of arrival and departure times, outdoor displays in which only the screen need be outdoors and the more expensive contents are protected from the weather, vandalism, etc., large letter paging systems that can change or retain information without dependence upon clear or repeated voice communication.

In view of the above disclosure, many modifications and applications of the present invention will be obvious to those of ordinary skill in the art. Therefore, the present invention is limited only by the claims appended hereto.

What is claimed is:

1. A compact information projector for projecting electronically generated display images on a remote surface, said images based upon electronic signals, said projector comprising:
   a light source for projecting a beam of light along an optical path;
   twisted nematic liquid crystal display, located in said optical path, for controlling polarization of light passing therethrough in response to localized energization and de-energization of said liquid crystal display in accordance with said electronic signals;
   at least a first reflecting mirror located in said optical path and directly optically between said light source and said liquid crystal display, where directly optically between is defined as both visible and infrared light from said light source being reflected only by said reflecting mirror before it encounters said liquid crystal display;
   at least one infrared reflector, located in said optical path and optically between said light source and said twisted nematic liquid crystal display, said at least one infrared reflector reflects infrared light and passes visible light;
   at least one Fresnel lens, located in said optical path between said light source and said twisted nematic liquid crystal display, for collimating light passing through said liquid crystal display;
   a light transparent air space, said air space having an air entrance and an air exit, said air space located on said optical axis and between said liquid crystal display and said light source;
   a fan, associated with one of said air entrance and said air exit, for moving air through said light transparent air space and for cooling said liquid crystal display;
   at least a second reflecting mirror, located in said optical path between said liquid crystal display and said remote surface;
   a control, responsive to said electronic signals, for selectively and locally energizing said liquid crystal display;
   a back polarizer, disposed in said beam and located between said crystal means and said light source, for polarizing light passing therethrough; and
   a front analyzer, disposed in said beam and located between said liquid crystal display and said remote surface, for allowing light of a selected polarization to pass therethrough and for blocking light not having said selected polarization.

2. A compact information projector for projecting electronically generated display images on a remote surface, said images based upon electronic signals, said projector comprising:
   means for projecting a beam of light along an optical path, said projecting means including a light source;
   twisted nematic crystal means, located in said optical path, for controlling polarization of light passing therethrough in response to localized energization and de-energization of said crystal means in accordance with said electronic signals;
   at least one mirror means, located optically between said light source and said twisted nematic crystal means, said at least one mirror means comprises means for reflecting visible light and for passing infrared light;
   at least one infrared reflector means located optically between said light source and said twisted nematic crystal means, said at least one infrared reflector means comprises means for reflecting infrared light and for passing visible light;
   means, responsive to said electronic signals, for selectively and locally energizing said crystal means;
   back polarizing means, disposed in said beam and located between said crystal means and said light source, for polarizing light passing therethrough; and
   front analyzing means, disposed in said beam and located between said crystal means and said remote surface, for allowing light of a selected polarization to pass therethrough and for blocking light not having said selected polarization.

3. The projector according to claim 2, further including a plurality of mirrors located in said optical path.

4. The projector according to claim 3, wherein there is further included lens system means, located in said optical path, for focusing said electronically generated display images on said remote surface.

5. The projector according to claim 4, wherein said lens system means includes a means for adjustably focusing said display images on said remote surface.

6. The projector according to claim 2, wherein said at least one mirror means is located optically between said infrared reflector means and said light source.

7. The projector according to claim 2, wherein said at least one mirror means comprises a first reflecting mirror, said first reflecting mirror is in a plane and has entrance and exit angles, and said plane makes an angle of substantially 45° with said optical path with respect to both the entrance and exit angles.

8. The projector according to claim 2, wherein, there is further included a second reflecting mirror, located in said optical path between said crystal means and said remote surface, said second reflecting mirror is in a plane and has entrance and exit angles, and said plane makes an angle of substantially 45° with said optical path with respect to both the entrance and exit angles.

9. The projector according to claim 2, wherein said at least one mirror means comprises a first reflecting mirror and further including a second reflecting mirror, located in said optical path between said crystal means and said remote surface, said first and second reflecting mirrors are in respective planes and each of said first and second reflecting mirrors have entrance and exit angles, and said respective planes make angles of substantially 45° with said optical path with respect to both the entrance and exit angles and the planes are at right angles with respect to one another.

10. The projector according to claim 2, wherein said infrared reflector means is located between said at least one mirror means and said crystal means.

11. The projector according to claim 2, wherein said infrared reflector means is comprised of an infrared reflecting film.

12. The projector according to claim 2, further including at least one Fresnel lens, located in said optical path between said light source and said twisted nematic crystal means, for collimating light passing through said crystal means, wherein said at least one Fresnel lens is located between said first reflecting mirror and said infrared reflecting means.

13. The projector according to claim 2, further including means for defining a light transparent air space, said air space having an air entrance and an air exit, said air space located on said optical axis and between said crystal means and said light source, wherein said means for defining a light transparent air space comprises a means for spacing said infrared reflector means from said crystal means.

14. The projector according to claim 13, further including means, associated with one of said air entrance and said air exit, for moving air through said light transparent air space and for cooling said crystal means, wherein said means for moving is associated with said air entrance and comprises a coolant supply means for providing air to said air entrance.

15. The projector according to claim 2, wherein said selectively and locally energizing means comprises a first plurality of conductors and a second plurality of conductors at least partially crossing said first plurality of conductors, such that when a single conductor from said first plurality and a single conductor from said second plurality are energized, said crystal means is energized in the vicinity of the crossing of said single conductors.

16. A compact information projector for projecting electronically generated display images on a remote surface, said images based upon electronic signals, said projector comprising:
means for projecting a beam of light along an optical path, said projecting means including a light source;
twisted nematic crystal means, located in said optical path, for controlling polarization of light passing therethrough in response to localized energization and de-energization of said crystal means in accordance with said electronic signals;
at least one mirror means, located directly optically between said light source and said twisted nematic crystal means, said at least one mirror means comprises means for reflecting visible light and for passing infrared light, where directly optically between is defined as visible light from said light source being reflected only by said at least one mirror means before it encounters said twisted nematic crystal means;
means, responsive to said electronic signals, for selectively and locally energizing said crystal means,;
back polarizing means, disposed in said beam and located between said crystal means and said light source, for polarizing light passing therethrough; and
front analyzing means, disposed in said beam and located between said crystal means and said remote surface, for allowing light of a selected polarization to pass therethrough and for blocking light not having said selected polarization.

17. The projector according to claim 16, further including a plurality of mirrors located in said optical path.

18. The projector according to claim 16, wherein there is further included lens system means, located in said optical path, for focusing said electronically generated display images on said remote surface.

19. The projector according to claim 18, wherein said lens system means includes a means for adjustably focusing said display images on said remote surface.

20. The projector according to claim 16, wherein said at least one mirror means is in a plane and has entrance and exit angles, and said plane makes an angle of substantially 45° with said optical path with respect to both the entrance and exit angles.

21. The projector according to claim 16, wherein, there is further included a reflecting mirror, located in said optical path between said crystal means and said remote surface, said reflecting mirror is in a plane and has entrance and exit angles, and said plane makes an angle of substantially 45° with said optical path with respect to both the entrance and exit angles.

22. The projector according to claim 16, further including a reflecting mirror, located in said optical path between said crystal means and said remote surface, said mirror means and reflecting mirror are in respective planes and have entrance and exit angles, said respective planes make angles of substantially 45° with said optical path with respect to both the entrance and exit angles and the planes are at right angles with respect to one another.

23. The projector according to claim 16, further including at least one infrared reflector means for reflecting infrared light and for passing visible light, said infrared reflector means is located between said at least one mirror means and said crystal means.

24. The projector according to claim 23, wherein said infrared reflector means is comprised of an infrared reflecting film.

25. The projector according to claim 16, further including at least one Fresnel lens, located in said optical path between said light source and said twisted nematic crystal means, for collimating light passing through said crystal means, wherein said at least one Fresnel lens is located between said mirror means and said crystal means.

26. The projector according to claim 16, further including means for defining a light transparent air space, said air space having an air entrance and an air exit, said air space located on said optical axis and between said crystal means and said light source, wherein said means for defining a light transparent air space comprises a means for spacing said back polarizer means from said crystal means.

27. The projector according to claim 26, further including means, associated with one of said air entrance and said air exit, for moving air through said light transparent air space and for cooling said crystal means, wherein said means for moving is associated with said air entrance and comprises a coolant supply means for providing air to said air entrance.

28. The projector according to claim 16, wherein said selectively and locally energizing means comprises a first plurality of conductors and a second plurality of conductors at least partially crossing said first plurality of conductors, such that when a single conductor from said first plurality and a single conductor from said second plurality are energized, said crystal means is energized in the vicinity of the crossing of said single conductors.

29. A compact information projector for projecting electronically generated display images on a remote surface, said images based upon electronic signals, said projector comprising:
  means for projecting a beam of light along an optical path, said projecting means including a light source;
  twisted nematic crystal means, located in said optical path, for controlling polarization of light passing therethrough in response to localized energization and de-energization of said crystal means in accordance with said electronic signals;
  at least a first reflecting mirror located in said optical path and directly optically between said light source and said twisted nematic crystal means, where directly optically between is defined as both visible and infrared light from said light source being reflected only by said reflecting mirror before it encounters said twisted nematic crystal means;
  at least one infrared reflector means located in said optical path and optically between said light source and said twisted nematic crystal means, said at least one infrared reflector means comprises means for reflecting infrared light and for passing visible light;
  at least one Fresnel lens, located in said optical path between said light source and said twisted nematic crystal means, for collimating light passing through said crystal means;
  means for defining a light transparent air space, said air space having an air entrance and an air exit, said air space located on said optical axis and between said crystal means and said light source;
  means, associated with one of said air entrance and said air exit, for moving air through said light transparent air space and for cooling said crystal means;
  at least a second reflecting mirror, located in said optical path between said twisted nematic crystal means and said remote surface;
  means, responsive to said electronic signals, for selectively and locally energizing said crystal means;
  back polarizing means, disposed in said beam and located between said crystal means and said light source, for polarizing light passing therethrough; and
  front analyzing means, disposed in said beam and located between said crystal means and said remote surface, for allowing light of a selected polarization to pass therethrough and for blocking light not having said selected polarization.

30. The projector according to claim 29, further including a plurality of mirrors located in said optical path.

31. The projector according to claim 29, wherein there is further included lens system means, located in said optical path, for focusing said electronically generated display images on said remote surface.

32. The projector according to claim 31, wherein said lens system means includes a means for adjustably focusing said display images on said remote surface.

33. The projector according to claim 29, wherein said first reflecting mirror is in ak plane and has entrance and exit angles, and said plane makes an angle of substantially 45° with said optical path with respect to both the entrance and exit angles.

34. The projector according to claim 29, wherein said second reflecting mirror is in a plane and has entrance and exit angles, and said plane makes an angle of substantially 45° with said optical path with respect to both the entrance and exit angles.

35. The projector according to claim 29, wherein said first and second reflecting mirrors are in respective planes and each of said first and second reflecting mirrors have entrance and exit angles, and said respective planes make angles of substantially 45° with said optical path with respect to both the entrance and exit angels and the planes are at right angles with respect to one another.

36. The projector according to claim 29, wherein said infrared reflector is located between said first reflecting mirror and said crystal means.

37. The projector according to claim 29, wherein said infrared reflector means is comprised of an infrared reflecting film.

38. The projector according to claim 29, wherein said at least one Fresnel lens is located between said first reflecting mirror and said infrared reflecting means.

39. The projector according to claim 29, wherein said means for defining a light transparent air space comprises a means for spacing said infrared reflector means from said crystal means.

40. The projector according to claim 29, wherein said means for moving is associated with said air entrance and comprises a coolant supply means for providing air to said air entrance.

41. The projector according to claim 29, wherein said selectively and locally energizing means comprise a first plurality of conductors and a second plurality of conductors at least partially crossing said first plurality of conductors, such that when a single conductor from said first plurality and a single conductor from said second plurality are energized, said crystal means is energized in the vicinity of the crossing of said single conductors.

* * * * *

UNITED STATES PATENT AND TRADEMARK OFFICE
CERTIFICATE OF CORRECTION

PATENT NO. : 5,227,821

DATED : July 13, 1993

INVENTOR(S) : James H. Vogeley and Arthur W. Vogeley

It is certified that error appears in the above-identified patent and that said Letters Patent is hereby corrected as shown below:

Column 9, lines 7 and 8, delete "mirror' which passes infrared but reflects visible light.".

Column 14, lines 15-18, amend to read as follows:
  30. The projector according to claim 29, further including at least three mirrors located along said optical path.

Column 14, line 26, change "ak" to --a--.

Signed and Sealed this

Eighth Day of February, 1994

*Attest:*

BRUCE LEHMAN

*Attesting Officer*  Commissioner of Patents and Trademarks